United States Patent
Kottilingam et al.

(10) Patent No.: US 10,773,310 B2
(45) Date of Patent: Sep. 15, 2020

(54) ADDITIVE MANUFACTURING SYSTEM, ARTICLE, AND METHOD OF MANUFACTURING AN ARTICLE

(71) Applicant: GENERAL ELECTRIC COMPANY, Schenectady, NY (US)

(72) Inventors: Srikanth Chandrudu Kottilingam, Simpsonville, SC (US); Prabhjot Singh, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 540 days.

(21) Appl. No.: 15/420,939

(22) Filed: Jan. 31, 2017

(65) Prior Publication Data

US 2018/0214955 A1     Aug. 2, 2018

(51) Int. Cl.
| | |
|---|---|
| *B22F 7/02* | (2006.01) |
| *B33Y 10/00* | (2015.01) |

(Continued)

(52) U.S. Cl.
CPC .............. *B22F 7/02* (2013.01); *B22F 3/1055* (2013.01); *B22F 5/009* (2013.01); *B22F 5/10* (2013.01); *B22F 7/008* (2013.01); *B23K 15/0086* (2013.01); *B23K 15/0093* (2013.01); *B23K 26/0006* (2013.01); *B23K 26/342* (2015.10); *B23K 26/702* (2015.10); *B28B 1/001* (2013.01); *B29C 64/153* (2017.08); *B33Y 10/00* (2014.12); *B33Y 30/00* (2014.12); *B33Y 50/02* (2014.12);

(Continued)

(58) Field of Classification Search
CPC .................................................... B33Y 30/00
See application file for complete search history.

(56) References Cited

U.S. PATENT DOCUMENTS

| 6,995,334 B1 | 2/2006 | Kovacevic et al. |
| 9,126,167 B2 | 9/2015 | Ljungblad |

(Continued)

FOREIGN PATENT DOCUMENTS

| WO | WO-2004096469 A1 * | 11/2004 | ............ B22F 1/0003 |
| WO | 2011082152 A1 | 7/2011 | |
| WO | 2015094694 A1 | 6/2015 | |

OTHER PUBLICATIONS

European Search Report and Search Opinion for EP18153391.0, dated Jun. 18, 2018, 10 pages.

*Primary Examiner* — Geoffrey S Evans
(74) *Attorney, Agent, or Firm* — McNees Wallace & Nurick LLC

(57) ABSTRACT

A method of additively manufacturing an article includes forming a first portion of the article by three-dimensional printing of a plurality of first layers from a first powder material cut having a first average particle size corresponding to a first feature resolution. The first layers have a first average layer thickness. The method also includes forming a second portion of the article by three-dimensional printing of a plurality of second layers from a second powder material cut having a second average particle size corresponding to a second feature resolution less than the first feature resolution. The second portion includes at least one feature. The second layers have a second average layer thickness less than the first average layer thickness. A three-dimensional printing system and an article formed from a powder material by three-dimensional printing are also disclosed.

17 Claims, 7 Drawing Sheets

(51) Int. Cl.
| | | |
|---|---|---|
| *B33Y 30/00* | (2015.01) | |
| *B23K 26/342* | (2014.01) | |
| *B29C 64/153* | (2017.01) | |
| *B22F 5/00* | (2006.01) | |
| *B22F 5/10* | (2006.01) | |
| *B33Y 50/02* | (2015.01) | |
| *B33Y 70/00* | (2020.01) | |
| *B33Y 80/00* | (2015.01) | |
| *B23K 26/70* | (2014.01) | |
| *B22F 3/105* | (2006.01) | |
| *B22F 7/00* | (2006.01) | |
| *B23K 15/00* | (2006.01) | |
| *B23K 26/00* | (2014.01) | |
| *B28B 1/00* | (2006.01) | |
| *B23K 103/10* | (2006.01) | |
| *B23K 103/04* | (2006.01) | |
| *B23K 103/00* | (2006.01) | |
| *B23K 103/14* | (2006.01) | |
| *B23K 103/16* | (2006.01) | |

(52) U.S. Cl.
CPC ............ *B33Y 70/00* (2014.12); *B33Y 80/00* (2014.12); *B22F 2003/1056* (2013.01); *B22F 2207/13* (2013.01); *B22F 2301/052* (2013.01); *B22F 2301/15* (2013.01); *B22F 2301/205* (2013.01); *B22F 2301/35* (2013.01); *B22F 2302/45* (2013.01); *B22F 2998/10* (2013.01); *B23K 2103/04* (2018.08); *B23K 2103/10* (2018.08); *B23K 2103/14* (2018.08); *B23K 2103/172* (2018.08); *B23K 2103/52* (2018.08); *Y02P 10/295* (2015.11)

(56) References Cited

U.S. PATENT DOCUMENTS

| | | | |
|---|---|---|---|
| 2009/0176007 A1* | 7/2009 | Uckelmann | A61C 13/0018 427/8 |
| 2010/0008816 A1* | 1/2010 | Hu | B23K 26/34 420/445 |
| 2011/0190904 A1* | 8/2011 | Lechmann | A61B 17/7208 623/23.61 |
| 2013/0108460 A1 | 5/2013 | Szwedowicz et al. | |
| 2013/0108726 A1* | 5/2013 | Uckelmann | B29C 67/0007 425/174.4 |
| 2013/0186514 A1* | 7/2013 | Zhuang | B01F 11/0002 141/11 |
| 2013/0287933 A1* | 10/2013 | Kaiser | B33Y 40/00 427/9 |
| 2014/0004462 A1* | 1/2014 | Zaretsky | G03G 15/0189 430/124.1 |
| 2014/0099476 A1 | 4/2014 | Subramanian et al. | |
| 2014/0255198 A1* | 9/2014 | El-Wardany | B22F 5/009 416/229 A |
| 2014/0295087 A1 | 10/2014 | Rickenbacher et al. | |
| 2015/0071809 A1* | 3/2015 | Nordkvist | B22F 1/0014 419/23 |
| 2015/0202687 A1* | 7/2015 | Pialot | B22F 3/1055 419/55 |
| 2015/0209978 A1 | 7/2015 | Snyder et al. | |
| 2015/0224607 A1 | 8/2015 | Bruck et al. | |
| 2016/0090848 A1 | 3/2016 | Engeli et al. | |
| 2016/0214211 A1 | 7/2016 | Gregg et al. | |
| 2016/0279703 A1* | 9/2016 | Clare | C23C 4/06 |
| 2016/0303656 A1 | 10/2016 | Lacy et al. | |
| 2017/0028631 A1* | 2/2017 | Hyatt | B05B 7/1468 |
| 2017/0072636 A1* | 3/2017 | Ng | B29C 64/153 |
| 2018/0065179 A1* | 3/2018 | Goto | B22F 3/105 |
| 2018/0178447 A1* | 6/2018 | Abbott, Jr. | B33Y 70/00 |
| 2018/0369917 A1* | 12/2018 | Mottin | B22F 3/1055 |
| 2019/0217543 A1* | 7/2019 | Pontiller-Schymura | B22F 3/1055 |
| 2020/0016826 A1* | 1/2020 | Edvinsson | B29C 64/393 |

\* cited by examiner

ADDITIVE MANUFACTURING SYSTEM, ARTICLE, AND METHOD OF MANUFACTURING AN ARTICLE

FIELD OF THE INVENTION

The present embodiments are directed to methods, systems, and articles achieving high feature fidelity. More specifically, the present embodiments achieve high feature fidelity articles by additive manufacturing without subsequent machining.

BACKGROUND OF THE INVENTION

Three-dimensional (3D) printing is an additive manufacturing technique enabling creation of an article by forming successive layers of material under computer control to create a 3D structure. The process typically includes selectively heating portions of a layer of powder of the material to melt or sinter the powder to the previously-placed layers to form the article layer by layer. Plastic, ceramic, glass, and metal articles may be formed by 3D printing from powders of plastic, ceramic, glass, and metal, respectively. A 3D printer lays down powder material, and a focused energy source melts or sinters that powder material in certain predetermined locations based on a model from a computer-aided design (CAD) file. Heating methods include direct metal laser melting (DMLM), direct metal laser sintering (DMLS), selective laser melting (SLM), selective laser sintering (SLS), and electron beam melting (EBM). Once one layer is melted or sintered and formed, the 3D printer repeats the process by placing additional layers of material on top of the first layer or where otherwise instructed, one layer at a time, until the entire article is fabricated. 3D printing may be accomplished by powder bed processing or other methods of powder processing.

Metal 3D printing enables manufacturers to create end-use metal articles that often outperform those produced with traditional casting techniques. Once those articles are installed for end-use, they continue to save money because of their light weight, high strength, and precise fit. In conventional article manufacturing, however, achieving high feature fidelity in an article formed by 3D printing may be difficult, if not impossible, without machining the article after formation by printing. For metal articles having features with tolerances in the range of +/−25 µm (+/−1.0 mil), it is not conventionally possible to achieve such high feature fidelity by metal 3D printing alone. The current lower limit is about 76 µm (3.0 mil). In the current conventional metal 3D printers, a single powder hopper and a single powder cut (powder size distribution) is used. A conventional metal powder cut for DMLM has an average particle size of about 30 µm (about 1.2 mil), with the particle size distribution being in the range of about 10 µm to about 45 µm (about 0.4 to about 1.8 mil). Such metal powder cuts are appropriate for build layer thicknesses of about 50 µm (2.0 mil) or greater. In order to achieve tolerances below about 76 µm (3.0 mil) with such build layers, a machining step is required after the metal 3D printing.

Conventional ceramic powder cuts have an average particle size and a particle size distribution similar to conventional metal powder cuts.

BRIEF DESCRIPTION OF THE INVENTION

In an embodiment, a method of additively manufacturing an article includes forming a first portion of the article by three-dimensional printing of a plurality of first layers from a first powder material cut having a first average particle size corresponding to a first feature resolution. The first layers have a first average layer thickness. The method also includes forming a second portion of the article by three-dimensional printing of a plurality of second layers from a second powder material cut having a second average particle size corresponding to a second feature resolution less than the first feature resolution. The second portion includes at least one feature. The second layers have a second average layer thickness less than the first average layer thickness.

In another embodiment, a three-dimensional printing system includes a printing platform, a powder deposition assembly, and a focused energy source. The powder deposition assembly is configured to controllably and selectively provide a first powder material cut having a first average particle size corresponding to a first feature resolution or a second powder material cut having a second average particle size corresponding to a second feature resolution to the printing platform. The second average particle size is less than the first average particle size. The focused energy source is configured to supply heating energy to powder material on the printing platform.

In another embodiment, an article includes a first portion including a plurality of first layers from a first powder material cut having a first average particle size corresponding to a first feature resolution. The first layers have a first average layer thickness. The article also includes a second portion including a plurality of second layers from a second powder material cut having a second average particle size corresponding to a second feature resolution less than the first feature resolution. The second portion includes at least one feature. The second layers have a second average layer thickness less than the first average layer thickness.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
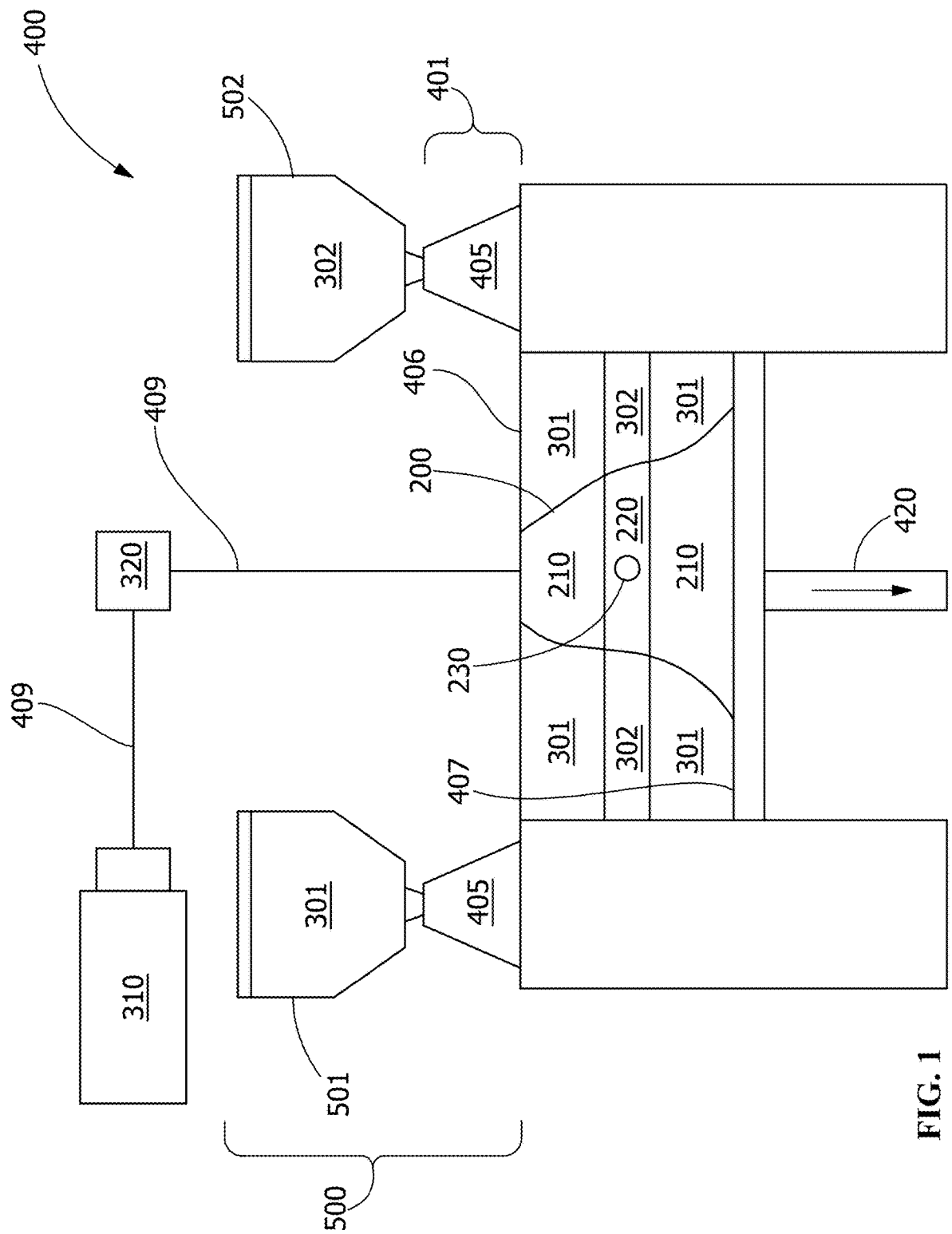
FIG. 1 is a schematic view of a three-dimensional (3D) printing system in an embodiment of the present disclosure.

Provided are methods, systems, and articles achieving high feature fidelity by additive manufacturing without subsequent machining.

Embodiments of the present disclosure, for example, in comparison to concepts failing to include one or more of the features disclosed herein, achieve higher feature fidelity by additive manufacturing, achieve high feature fidelity by additive manufacturing without subsequent machining, eliminate machining in high feature fidelity formation, reduce manufacturing time for formation of high feature fidelity articles, reduce manufacturing cost for high feature fidelity articles, or combinations thereof.

As used herein, "high fidelity" or "high feature fidelity" refers to a feature of an article having a tolerance less than a tolerance of a conventional three-dimensional (3D) printed article, which is, for example, about 76 μm (3.0 mil) for metals. In some embodiments, the high fidelity feature has a tolerance of 70 μm (2.8 mil), alternatively 65 μm (2.6 mil), alternatively 60 μm (2.4 mil), alternatively 55 μm (2.2 mil), alternatively 50 μm (2.0 mil), alternatively 45 μm (1.8 mil), alternatively 40 μm (1.6 mil), alternatively 35 μm (1.4 mil), alternatively 30 μm (1.2 mil), alternatively 25 μm (1.0 mil), alternatively 20 μm (0.8 mil), or any value therebetween.

In some embodiments, the high fidelity feature is formed from a powder cut having an average particle size of about 25 μm (about 1.0 mil), alternatively about 20 μm (about 0.8 mil), alternatively about 15 μm (about 0.6 mil), alternatively about 10 μm (about 0.4 mil), or any value therebetween.

In some embodiments, the high fidelity feature is formed from a powder cut having a particle size distribution in the range of about 10 μm to about 40 μm (about 0.4 mil to about 1.6 mil), alternatively in the range of about 10 μm to about 35 μm (about 0.4 mil to about 1.4 mil), alternatively in the range of about 10 μm to about 30 μm (about 0.4 mil to about 1.2 mil), alternatively in the range of about 10 μm to about 25 μm (about 0.4 mil to about 1.0 mil), alternatively in the range of about 10 μm to about 20 μm (about 0.4 mil to about 0.8 mil), alternatively in the range of about 5 μm to about 15 μm (about 0.2 mil to about 0.6 mil), or any range or sub-range therebetween.

In some embodiments, the high fidelity feature is formed from a build layer thickness of about 45 μm (about 1.8 mil), alternatively about 40 μm (about 1.6 mil), alternatively about 35 μm (about 1.4 mil), alternatively about 30 μm (about 1.2 mil), alternatively about 25 μm (about 1.0 mil), alternatively about 20 μm (about 0.8 mil), or any value therebetween.

Referring to FIG. 1, the additive manufacturing process may be performed with a 3D printing system 400, where the powder deposition assembly 500 includes a first hopper 501, a second hopper 502, a powder delivery assembly 401, and a focused energy source 310. The powder delivery assembly 401 includes at least one powder material feeder 405 supplied with a first powder material cut 301 from the first hopper 501 or supplied with a second powder material cut 302 from the second hopper 502. The powder material feeder 405 deposits and spreads the material of the first powder material cut 301 or the second powder material cut 302 across the surface 406 of the powder bed above the printing platform 407 as a new layer to be sintered or melted. The hoppers 501, 502 may move with the powder material feeders 405 during deposition of the new layer or the hoppers 501, 502 may alternatively be stationary within the 3D printing system 400. Although two powder material feeders 405 are shown in FIG. 1, one for each hopper 501, 502, a single powder material feeder 405 may alternatively be used for both hoppers 501, 502, as shown in FIG. 2, since only one powder cut 301, 302 is delivered at a time.

The 3D printing system 400 includes a focused energy source 310 to fuse powder plastic, powder metal, powder ceramic, or powder glass to form the article 200. In some embodiments, the focused energy source 310 is a high power laser. In some embodiments, the high power laser is a carbon dioxide laser. In some embodiments, the focused energy beam 409 is a pulsed beam. The focused energy beam 409 is directed by a scanner 320 to selectively fuse powder material by scanning cross-sections generated from a 3D digital description, such as, for example, a CAD file or scan data, of the article 200 on the surface of a powder bed on a printing platform 407. Before each cross-section is scanned, the powder bed is lowered by one layer thickness by actuating a fabrication piston 420 to lower the printing platform 407 and one of the powder material feeders 405 is actuated to deposit the material of the first powder material cut 301 from the first hopper 501 or to deposit the material of the second powder material cut 302 from the second hopper 502 as a new layer of powder material on top of the powder bed. The process is repeated until the article 200 is completed.

The article 200 being constructed is surrounded by un-sintered powder material at all times, which allows for the construction of previously-impossible geometries. The articles 200 being formed in FIG. 1 and FIG. 2 include two first portions 210 having a first layer thickness based on a first feature resolution separated by a second portion 220 having a second layer thickness based on a second feature resolution. The second portion 220 includes a feature 230 having a high fidelity.

Figure 2:
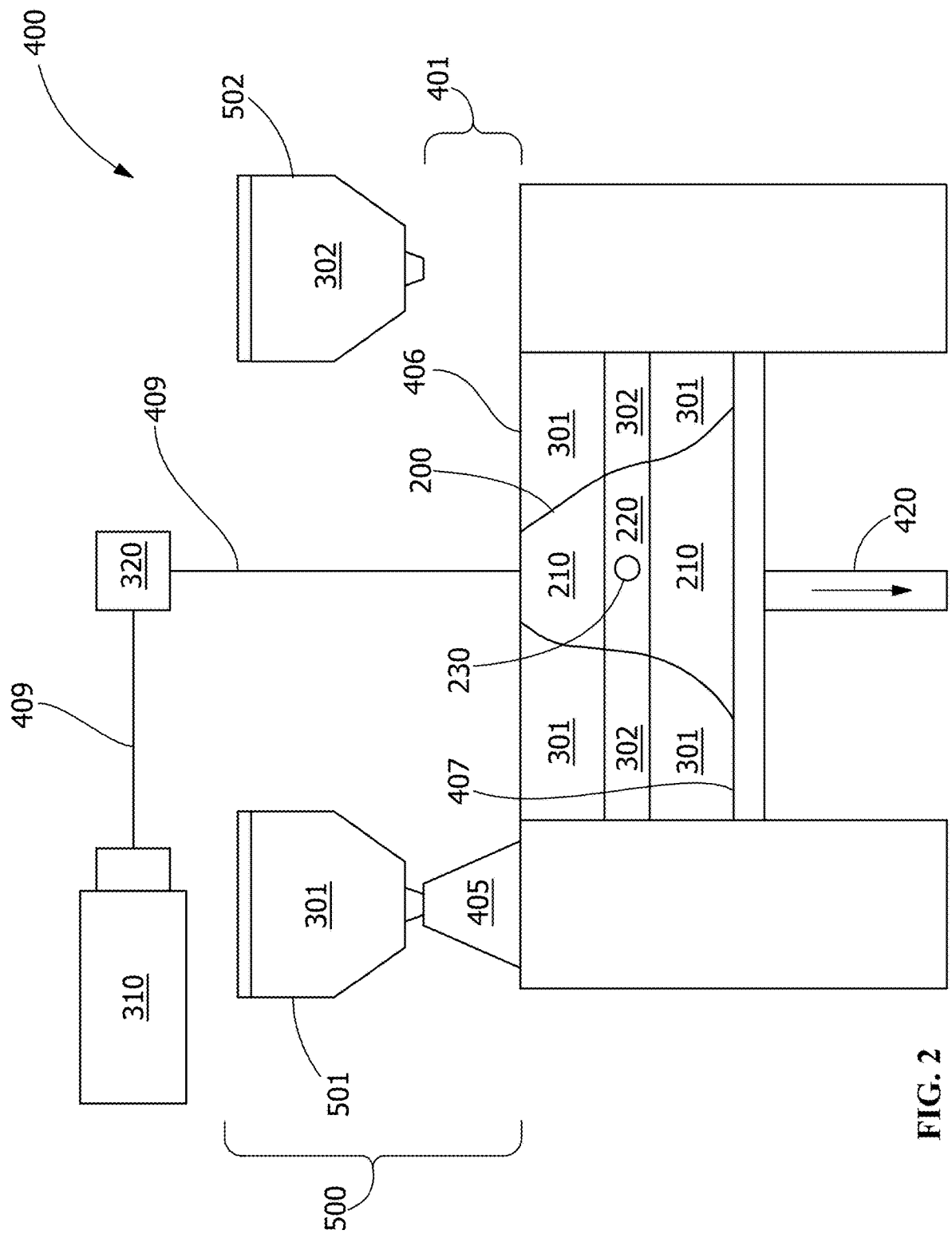
FIG. 2 is a schematic view of another 3D printing system in an embodiment of the present disclosure.
Figure 3:
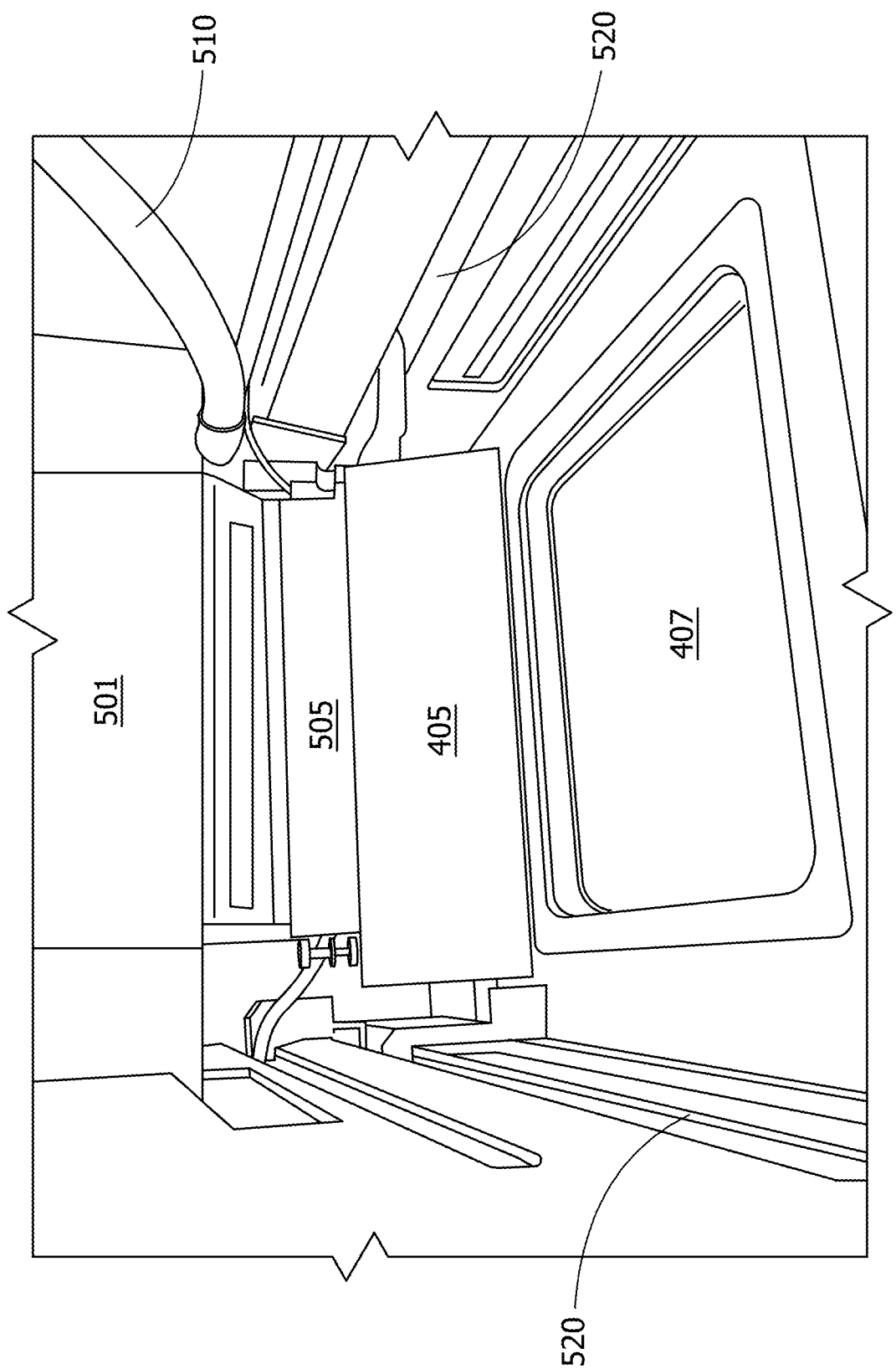
FIG. 3 is a schematic perspective view showing the printing platform, a hopper, and a powder delivery assembly of the embodiments of FIG. 1 and FIG. 2.

FIG. 3 shows a perspective view of an interior portion of an embodiment of a 3D printing system 400 such as those shown schematically in FIG. 1 and FIG. 2. In addition to a printing platform 407, a powder material feeder 405, and a first hopper 501, a control system 505, a powder supply line 510 to the first hopper 501 and tracks 520 for translation of the powder material feeder 405 across the printing platform 407 are also visible. In some embodiments, the powder material feeder 405 shown in FIG. 3 is referred to as a recorder.

Figure 4:
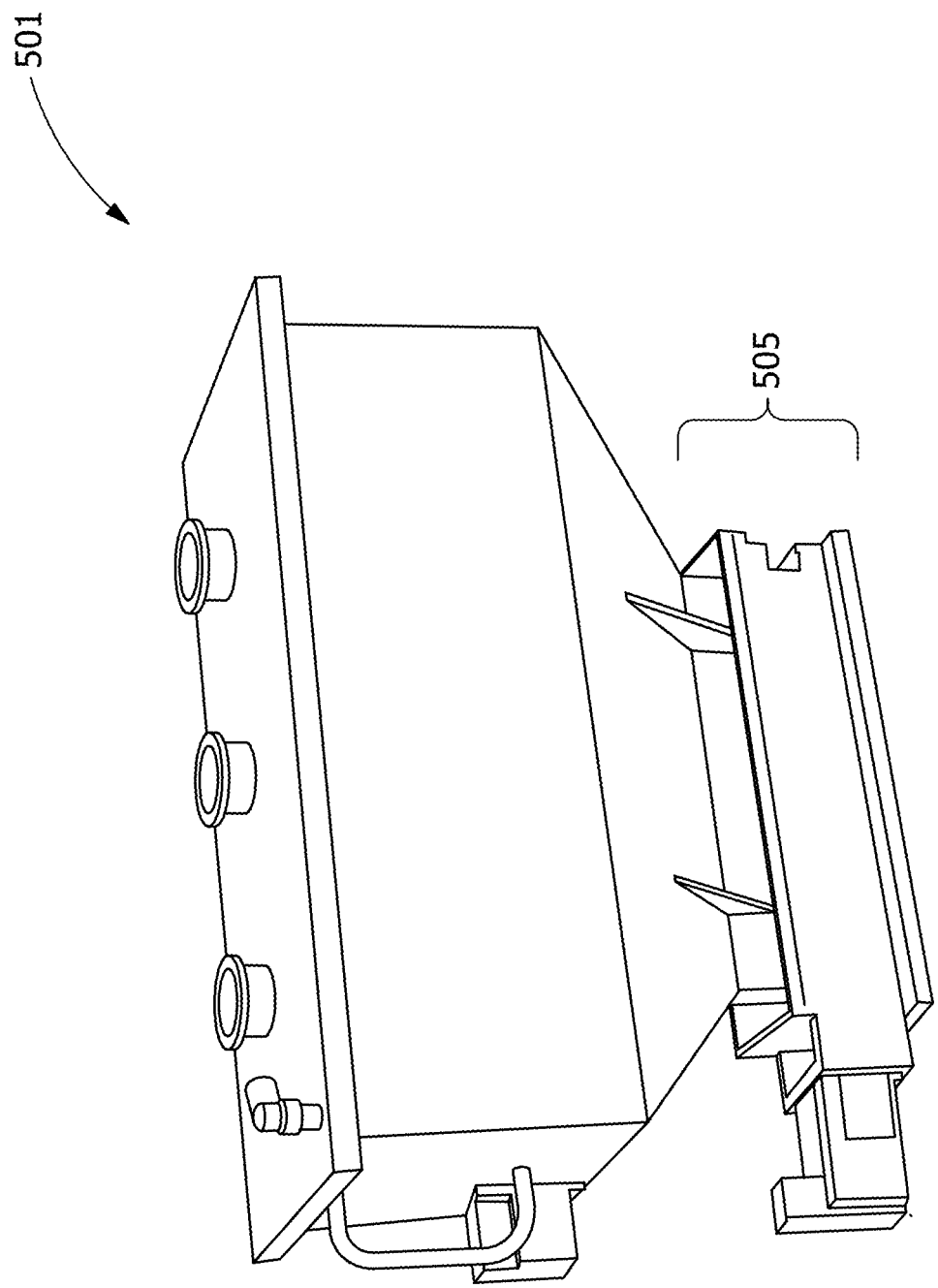
FIG. 4 is a schematic perspective view of the powder delivery assembly of FIG. 3.

FIG. 4 shows a perspective view of an embodiment of a first hopper 501, such as the first hopper shown in FIG. 1 and FIG. 2. The control system 505 below the powder chamber of the first hopper 501 selectively permits the material of the first powder material cut 301 to leave the first hopper 501 and go into the powder material feeder 405.

Figure 5:
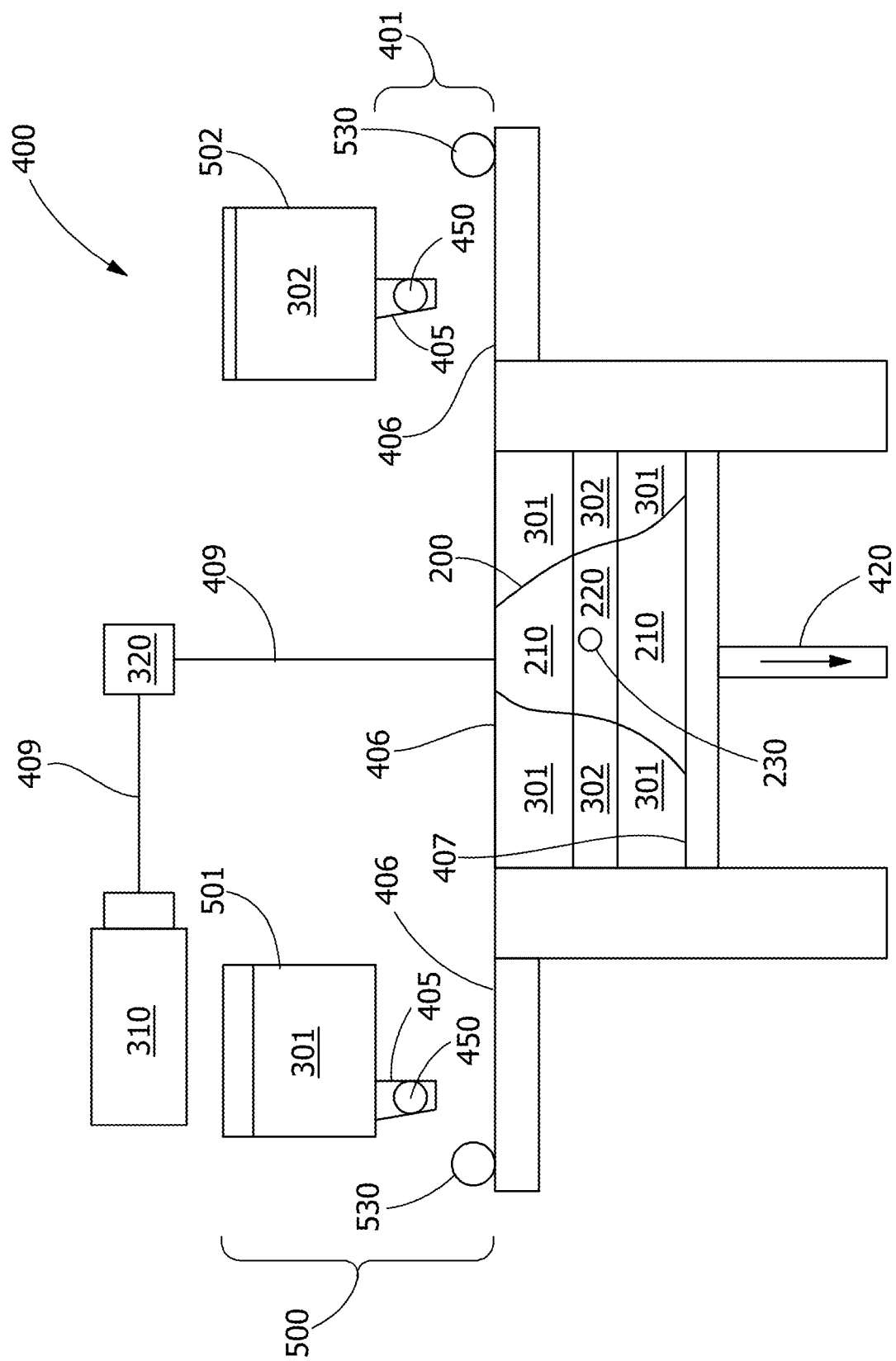
FIG. 5 is a schematic view of another 3D printing system in an embodiment of the present disclosure.

The 3D printing process may alternatively be performed with a 3D printing system 400, where the powder deposition assembly 500 includes a first hopper 501, a second hopper 502, and a powder delivery assembly 401, as shown in FIG. 5. The powder delivery assembly 401 includes at least one powder material feeder 405 supplied with a first powder material cut 301 from the first hopper 501 or supplied with a second powder material cut 302 from the second hopper 502, and at least one spreader 530 spreading the material of the first powder material cut 301 or the second powder material cut 302 on the surface 406 as a layer across the top of the powder bed above the printing platform 407 as a new layer to be sintered or melted. At least one valve 450 selectively controls whether the first powder material cut 301, the second powder material cut 302, or no powder material is fed to the surface 406.

Although two powder material feeders 405, two valves 450, and two spreaders 530 are shown in FIG. 5, one for each hopper 501, 502, a single powder material feeder 405, a single valve 450, and/or a single spreader 530 may alternatively be used for both hoppers 501, 502, since preferably only one powder cut 301, 302 is delivered to the surface 406 at a time. The spreader 530 may be any device capable of moving powder material across the surface 406 to form a layer above the printing platform 407. In some embodiments, the spreaders 530 are rollers. In some embodiments, the spreaders 530 are blades. Although the powder material feeders 405 are shown as depositing powder material on either side of the printing platform 407, the first powder material cut 301 and the second powder material cut 302 may alternatively be deposited on the same side of the printing platform 407 or directly above the printing platform 407.

The 3D printing process includes a focused energy source 310 to fuse powder plastic, powder metal, powder ceramic, or powder glass to form the article 200. In some embodiments, the focused energy source 310 is a high power laser. In some embodiments, the high power laser is a carbon dioxide laser. In some embodiments, the focused energy beam 409 is a pulsed beam. The focused energy beam 409 is directed by a scanner 320 to selectively fuse powder material by scanning cross-sections generated from a 3D digital description, such as, for example, a CAD file or scan data, of the article 200 on the surface 406 of a powder bed on a printing platform 407. Before each cross-section is scanned, the powder bed is lowered by one layer thickness by actuating a fabrication piston 420 to lower the printing platform 407, the first powder material cut 301 from the first hopper 501 or the second powder material cut 302 from the second hopper 502 is directed onto the surface 406 in an amount of material that is about the equivalent of one layer thickness of the powder bed, and the spreader 530 applies the new material as a new layer on top of the powder bed by the spreader 530. The process is repeated until the article 200 is completed.

The article 200 being constructed is surrounded by un-sintered powder material at all times, which allows for the construction of previously-impossible geometries. The article 200 being formed in FIG. 5 includes two first portions 210 having a first layer thickness based on a first feature resolution separated by a second portion 220 having a second layer thickness based on a second feature resolution. The second portion 220 includes a feature 230 having a high fidelity.

Figure 6:
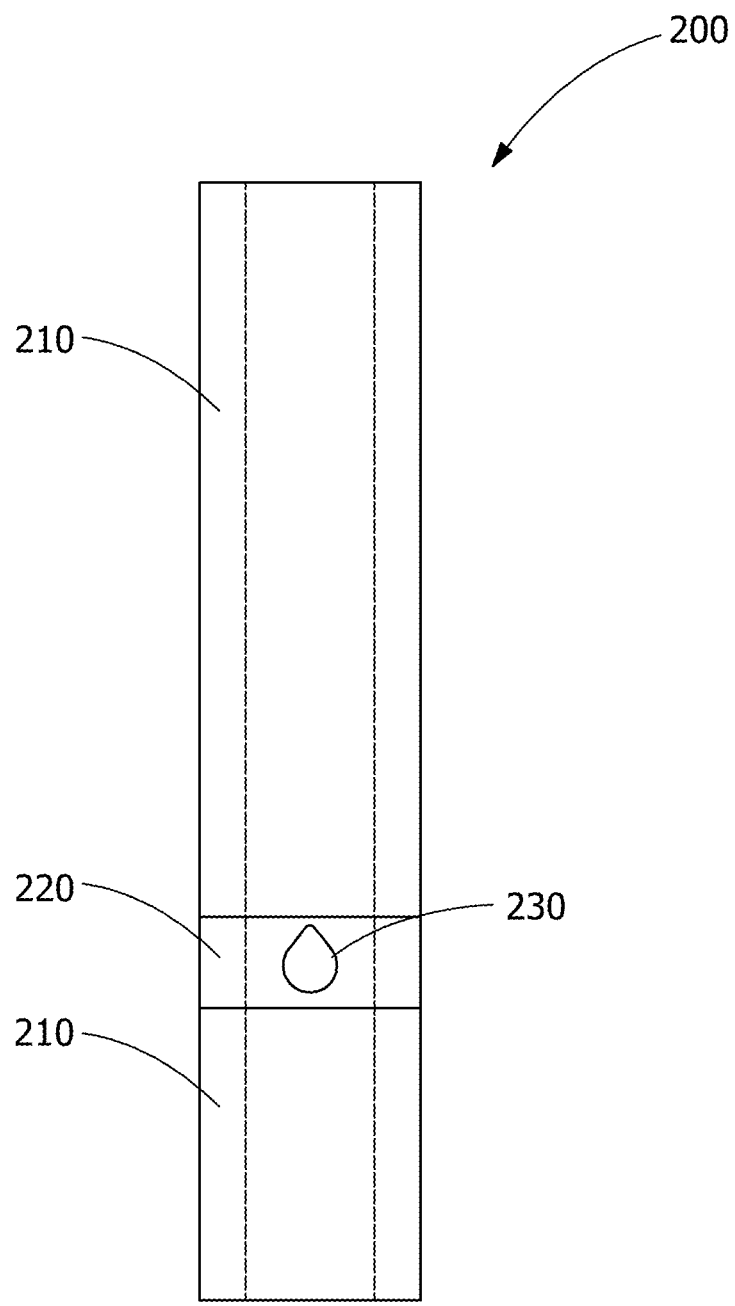
FIG. 6 is a schematic view of a model for a 3D printed article in an embodiment of the present disclosure.

FIG. 6 schematically shows a model of an article 200 having a tubular geometry. The article 200 includes two first portions 210 having a first layer thickness based on a first feature resolution separated by a second portion 220 having a second layer thickness based on a second feature resolution. The second portion 220 includes at least one feature 230 having a high fidelity. The first layer thickness is about 50 μm (2 mil) and the second layer thickness is about 20 μm (0.8 mil).

Figure 7:
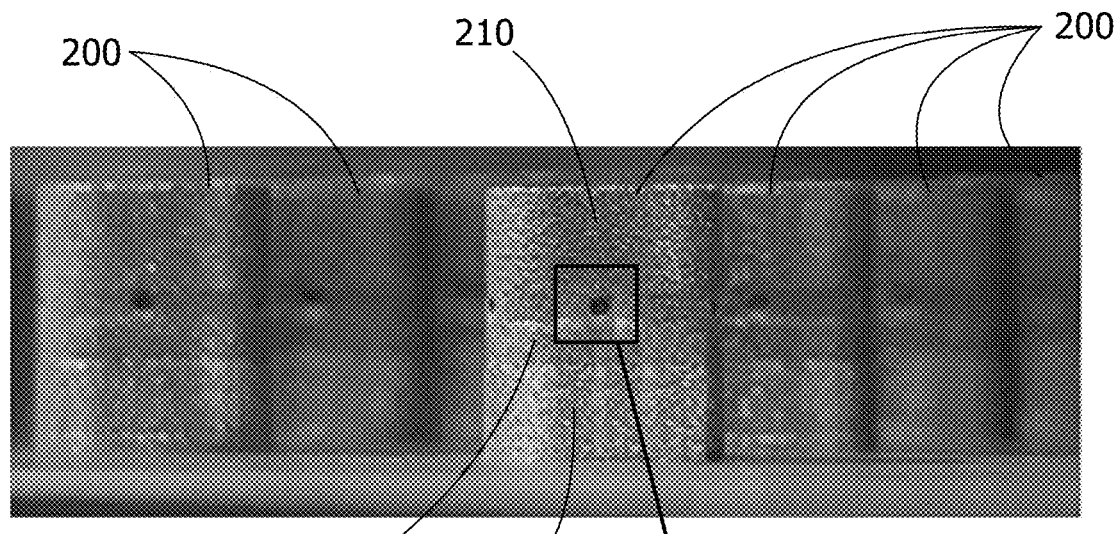
FIG. 7 is a photograph of 3D metal printed articles based on a model similar to the model of FIG. 6 in an embodiment of the present disclosure.

FIG. 7 shows a photograph of multiple articles 200 formed by 3D printing by a system disclosed herein. The articles 200 have a cylindrical geometry and include two first portions 210 having a first metal layer thickness based on a first feature resolution separated by a second portion 220 having a second metal layer thickness based on a second feature resolution. The first layer thickness is about 50 μm (2 mil) and the second layer thickness is about 20 μm (0.8 mil). As seen in FIG. 7, the first portions 210 have a different surface appearance than the second portion 220, resulting from a greater surface roughness for the first portions 210, with both portions 210, 220 having a different surface texture and appearance than a machined surface.

Figure 8:
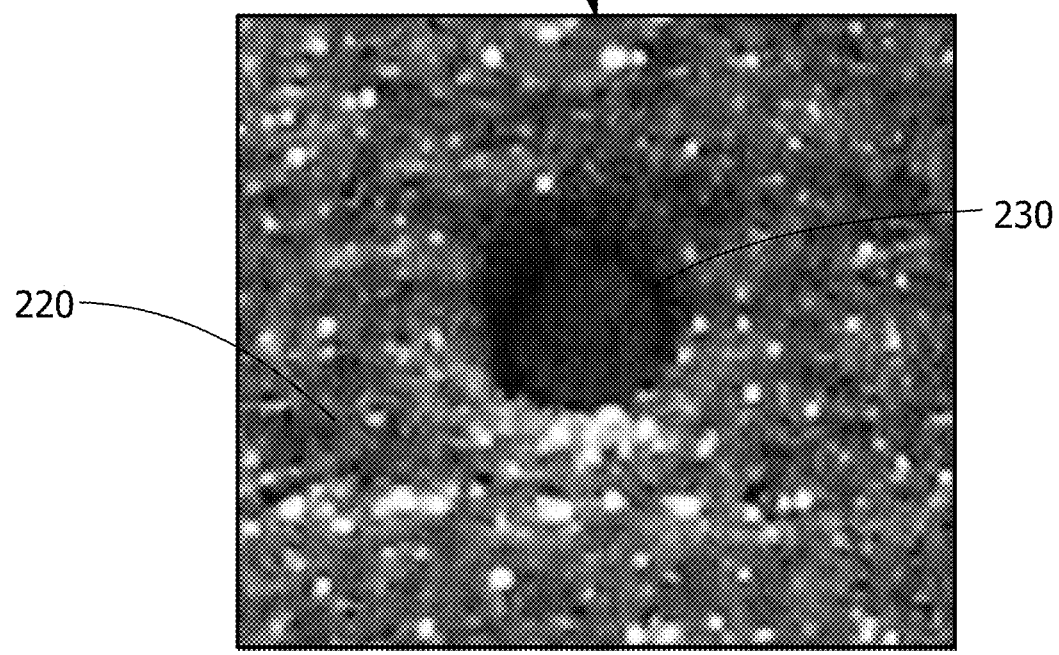
FIG. 8 is a photograph showing a feature formed in one of the articles of FIG. 7.

FIG. 8 shows an enlarged photograph of a feature 230 having a high fidelity in the second portion 220 with the second layer thickness. The feature 230 formed with a 20-μm (0.8 mil) build layer thickness has a higher feature fidelity than a feature formed with a 50-μm (2 mil) build layer thickness. Being able to use different size and distribution powder material for the same build job significantly improves the capability of metal 3D printing as a stand-alone manufacturing process, even beyond what conventional metal 3D printing in combination with machine finishing is able to achieve in some cases.

In some embodiments, movement of the printing platform 407 and/or the powder deposition assembly 500 of the 3D printing system 400 is controlled by software configured to automate the process and/or form the added material on the article 200 based upon a CAD model. In some embodiments, the process is an automated 3D printing process. In some embodiments, the relative movement of the printing platform 407 and/or the powder deposition assembly 500 provides a dimensional accuracy of at least +/−25 μm (+/−1 mil). Feedback sensors 350 evaluate the precision of the article 200 by measuring the actual dimensions of the deposited layers in comparison to the dimensions of the layer of the article 200 from the 3D CAD model.

In some embodiments, the powder material is a powder metal and the 3D printing is metal 3D printing. In some embodiments, the powder metal is a high-temperature superalloy. In some embodiments, the powder metal is an aluminum-based alloy, a titanium-based alloy, a steel-based alloy, a nickel-based superalloy, or a cobalt-based superalloy.

In some embodiments, the powder material is a powder ceramic and the 3D printing is ceramic 3D printing. The composition of the powder ceramic may include, but is not limited to, zirconia, silica, and alumina.

The method of manufacturing the article 200 may be by any additive manufacturing method or technique including melting or sintering layers of a powder material. In some embodiments, the 3D printing includes selective laser sintering (SLS), direct metal laser sintering (DMLS), selective laser melting (SLM), direct metal laser melting (DMLM), electron beam melting (EBM), powder bed processing, or combinations thereof. In some embodiments, the 3D printing includes SLS with a powder bed.

In some embodiments, the SLS process includes a focused energy source 310 to fuse powder plastic, powder metal, powder ceramic, or powder glass to form the article 200. In some embodiments, the focused energy source 310 is a high power laser. In some embodiments, the high power laser is a carbon dioxide laser. In some embodiments, the focused energy beam 409 is a pulsed beam. The focused energy beam 409 selectively fuses powder material by scanning cross-sections generated from a 3D digital description, such as, for example, a CAD file or scan data, of the article 200 on the surface 406 of a powder bed on a printing platform 407. After each cross-section is scanned, the powder bed is lowered by one layer thickness by lowering the printing platform 407, a new layer of powder material is applied on top, and the process is repeated until the article 200 is completed.

In some embodiments, the DMLS process includes a focused energy source 310 firing into a bed of powder metal. In some embodiments, the focused energy source 310 is a ytterbium (Yb)-fiber laser, or more specifically a high-power 200-watt Yb-fiber optic laser. The focused energy source 310 is automatically fired at points in space defined by a 3D CAD model to heat the powder metal and sinter it to the article 200 being formed. In some embodiments, computer software on a computer directs the focused energy source 310. Inside a build chamber area, the powder delivery assembly 401 includes a material dispensing platform dispensing the powder metal to a printing platform 407 and a recoater blade as the spreader 530 moving new powder material over the printing platform 407. The article 200 is built up additively, layer by layer. In some embodiments, the layers of the added material are about 20 micrometers thick.

In some embodiments, the DMLM process is performed with a powder delivery assembly 401 including one or more powder material feeders 405. During the DMLM process, the powder material feeders 405 selectively deliver the powder material and/or any other material directly as a new layer on the powder bed above the printing platform 407 or alternatively to the surface 406, where at least one spreader 530 directs the powder material toward the printing platform 407.

The relative movement of the printing platform 407 and/or the scanner 320 during the DMLM process may provide a dimensional accuracy of at least 25 µm (1 mil), at least 130 µm (5 mil), at least 250 µm (10 mil), between 25 µm and 250 µm (1 and 10 mil), between 25 µm and 130 µm (1 and 5 mil), or any combination, sub-combination, range, or sub-range thereof. Additionally, the DMLM process provides a fully dense metal in the article 200 formed therefrom.

Suitable focused energy sources 310 for the DMLM process include any focused energy source 310 operating in a power range and travel speed for melting a layer of the first powder material cut 301 or the second powder material cut 302 on the powder bed. In some embodiments, the focused energy source 310 is a laser. In one embodiment, the power range of the focused energy source 310 in the DMLM process includes, but is not limited to, between 100 and 3,000 watts, between 200 and 2,500 watts, between 300 and 2,000 watts, or any combination, sub-combination, range, or sub-range thereof. In another embodiment, the travel speed includes, but is not limited to, up to 300 mm/sec, between 1 and 300 mm/sec, between 4 and 250 mm/sec, or any combination, sub-combination, range, or sub-range thereof. For example, in a further embodiment, the focused energy source 310 operates in the power range of between 300 and 2,000 watts, at a travel speed of between 4 and 250 mm/sec. In another embodiment, a deposition rate for standard steels, titanium, and/or nickel alloys includes, for example, up to 1 kg/hour, up to 0.75 kg/hr, up to 0.5 kg/hour, between 0.1 and 0.5 kg/hour, up to 0.4 kg/hour, up to 0.3 kg/hour, or any combination, sub-combination, range, or sub-range thereof. The parameters of the focused energy source 310 and the deposition rate, however, may be adjusted and/or set depending on whether the first powder material cut 301 or the second powder material cut 302 is being supplied and/or on the layer thickness.

In some embodiments, the directing of the focused energy beam 409 includes moving the scanner 320 and/or the printing platform 407 relative to each other, the moving providing the shape and geometry of the added material on the article 200. To provide relative movement, the printing platform 407 may be fixed and the scanner 320 may be adjusted, the scanner 320 may be fixed and the printing platform 407 may be moved, or both the scanner 320 and the printing platform 407 may be adjusted independently of each other. For example, in one embodiment, the printing platform 407 includes three or more axes of rotation for moving relative to the scanner 320.

In some embodiments, the SLM process includes 3D CAD data as a digital information source and a focused energy source 310. In some embodiments, the focused energy source 310 is a high-power (hundreds of watts) laser, and more specifically a Yb-fiber laser. The focused energy beam 409 melts a fine powder material to build the article 200. The powder material is added layer-by-layer, the layers usually being about 20 µm to 100 µm (0.8 to 4 mil) in thickness. The focused energy beam 409 selectively melts thin layers of atomized fine powder material that are evenly distributed by a powder material feeder 405 onto the article 200 being formed. This occurs in a controlled inert-gas chamber. The inert gas is typically either argon or nitrogen with oxygen levels below 500 parts per million. The focused energy source 310 energy is intense enough to permit full melting of the powder material particles.

In some embodiments, the EBM process is similar to the SLM process, but an electron beam is used as the focused energy beam 409 rather than a laser beam. The EBM process may operate at higher temperatures, such as, for example, up to 1000° C. (1830° F.), and has the capability for higher pre-heats.

In some embodiments, the powder bed process includes a focused energy source 310 to fuse (e.g., sinter or melt) a powder material. The powder bed process builds up the added material 200 layer by layer from fine powders, typically about 5 µm to 50 µm (0.2 to 2 mil) in size. A powder bed system typically includes a powder supply, a printing platform 407, a powder delivery assembly 401 including a powder material feeder 405, a laser as the focused energy source 310, and a laser directing system. The powder material feeder 405 spreads a thin layer of powder material on the powder bed on the printing platform 407. The laser melts or sinters the powder material in locations where the build is to be made. The spreading and melting/sintering process is repeated as the article 200 is built layer-by-layer.

The selective control permits switching between the formation of a first layer thickness from the first powder material cut 301 and the formation of a second layer thickness from the second powder material cut 302. In some embodiments, each layer is formed with only one of the two powder material cuts 301, 302 to give a substantially uniform layer thickness. The first layer thickness and the second layer thickness are preferably in the range of about 10 µm to about 100 µm (0.4 mil to 4 mil). The first layer thickness may be at least about 40 µm (0.4 mil), alternatively in the range of about 40 µm to about 100 µm (2 mil to 4 mil), alternatively in the range of about 50 µm to about 80 µm (2 mil to 3.1 mil), alternatively in the range of about 50 µm to about 70 µm (0.4 mil to 2.8 mil), alternatively in the range of about 40 µm to about 60 µm (0.4 mil to 2.4 mil), or any range or sub-range therebetween. The second layer thickness may be less than or equal to about 25 (0.4 mil), alternatively in the range of about 10 µm to about 45 µm (0.4 mil to 1.8 mil), alternatively in the range of about 10 µm to about 35 µm (0.4 mil to 1.4 mil), alternatively in the range of about 10 µm to about 25 µm (0.4 mil to 1 mil), alternatively in the range of about 15 µm to about 25 µm (0.4 mil to 0.6 mil), or any range or sub-range therebetween.

A smaller build layer thickness and a smaller corresponding powder size and distribution are provided to achieve greater feature 230 fidelity. In some embodiments, the 3D printing system includes two powder hoppers 501, 502 with two different powder sizes and distributions. The hopper 502 with powder metal having a finer size and distribution is preferably only used for very specific layers where high feature 230 fidelity is desired. These specific layers are preferably built at 20 µm (0.8 mil) or sub-20 µm (sub-0.8 mil) build layer thickness. All of the other build layers may have a thickness of 50 µm (2 mil) or higher as necessary or desirable.

In some embodiments, a single focused energy source 310 is used both for layers of the first powder material cut 301 and for layers of the second powder material cut 302. The parameters of the focused energy source 310 and the deposition rate, however, may be adjusted and/or set depending on whether the first powder material cut 301 or the second powder material cut 302 is being supplied and/or on the layer thickness. The first powder material cut 301 is preferably used to quickly build first portions 210 of the article 200, whereas the second powder material cut 302 is used to build second portions 220 of the article 200 where higher resolution is desired.

In some embodiments, the 3D printing system 400 is arranged and operates in a manner similar to the SLM 280 HL model selective laser melting system (SLM Solutions GmbH, Lubeck, Germany), except that the 3D printing system 400 includes two hoppers 501, 502 holding two different powder cuts 301, 302 and one, at least one, or two powder material feeders 405 to selectively supply powder material from the two hoppers 501, 502. In some embodiments, the 3D printing system 400 includes up to a 280 mm by 280 mm by 365 build envelope, up to two fiber lasers with 3D scanning optics, a build rate of up to 55 cm$^3$/hr, or combinations thereof.

The 3D printing system 400 with two hoppers 501, 502 holding two different powder cuts 301, 302 and distributions permits variable build layer thickness and enables features 230 with finer fidelity. Larger powder size results in larger variations, making features 230 requiring 25 μm (+/−1 mil) tolerances impossible, since the powder diameter itself is close to 50 μm (2 mil). Lower tolerance is achieved by using a smaller build layer thickness and corresponding smaller powder particle size. Better fidelity of features 230 without compromising build rate is achieved by having two hoppers 501, 502 supplying different powder material cuts 301, 302. The different powder material cuts 301, 302 may be of the same powder composition or different powder compositions.

The article 200 may be any component requiring at least one feature 230 with high fidelity for at least a portion of the article 200. In some embodiments, the article 200 is a hot gas path component of a turbine. In some embodiments, the article 200 is a gas turbine seal, a gas turbine combustion component, such as, for example, a fuel nozzle, or a gas turbine hot gas path component, such as, for example, a gas turbine shroud, a gas turbine nozzle, or a gas turbine blade.

In some embodiments, high fidelity is achieved with features 230 that would otherwise be difficult or impossible to machine. For example, fuel holes have very tight tolerances, and machining holes at difficult to reach locations is expensive. A high fidelity fuel hole in an as-built condition eliminates the machining problem and reduces manufacturing cost.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A three-dimensional printing system comprising:
   a printing platform;
   a powder deposition assembly configured to controllably and selectively provide a first powder material cut having a first average particle size corresponding to a first feature resolution or a second powder material cut having a second average particle size corresponding to a second feature resolution to the printing platform, the second average particle size being less than the first average particle size, the powder deposition assembly comprising a powder material feeder configured to selectively deposit and spread the first powder material cut on the printing platform to form a first powder layer to be sintered or melted or selectively deposit and spread the second powder material cut on the printing platform to form a second powder layer to be sintered or melted, the first powder layer of the first powder material having a first layer thickness and the second powder layer of the second powder material having a second layer thickness less than the first layer thickness, the second layer thickness being 45 μm or less; and
   a focused energy source configured to supply heating energy to sinter or melt the first powder layer or the second powder layer on the printing platform;
   wherein the first powder material cut and the second powder material cut are each a composition selected from the group consisting of a high-temperature superalloy, a nickel-based superalloy, a cobalt-based superalloy, and combinations thereof.

2. The three-dimensional printing system of claim 1, wherein the powder deposition assembly further comprises:
   a first hopper storing the first powder material cut having the first average particle size; and
   a second hopper storing the second powder material cut having the second average particle size.

3. The three-dimensional printing system of claim 2 further comprising the first powder material cut in the first hopper and the second powder material cut in the second hopper.

4. The three-dimensional printing system of claim 1 further comprising a control system directing the heating energy based on a computer model of an article being formed by the three-dimensional printing system.

5. The three-dimensional printing system of claim 1, wherein the focused energy source is selected from the group consisting of a laser and an electron beam generator.

6. The three-dimensional printing system of claim 1, wherein the second average particle size is less than 25 μm.

7. The three-dimensional printing system of claim 6, wherein the first average particle size is at least 45 μm.

8. The three-dimensional printing system of claim 1, wherein the three-dimensional printing system is configured to form an article by a technique selected from the group consisting of direct metal laser melting, direct metal laser sintering, selective laser melting, selective laser sintering, electron beam melting, and combinations thereof.

9. The three-dimensional printing system of claim 1, wherein the three-dimensional printing system is configured to form an article from the first powder material cut and the second powder material cut, the article comprising:
   a first portion comprising a plurality of first layers from the first powder material cut having the first average particle size corresponding to the first feature resolution, the plurality of first layers having a first average layer thickness; and a second portion comprising a plurality of second layers from the second powder material cut having the second average particle size corresponding to a second feature resolution less than the first feature resolution, the second portion comprising at least one feature, the plurality of second layers having a second average layer thickness less than the first average layer thickness.

10. The three-dimensional printing system of claim 9, wherein the three-dimensional printing system is configured to form the article free from any machining after being formed by the three-dimensional printing.

11. The three-dimensional printing system of claim 9, wherein the three-dimensional printing system is configured to form the first average layer thickness of at least 50 µm.

12. The three-dimensional printing system of claim 9, wherein the three-dimensional printing system is configured to form the second average layer thickness of less than or equal to 25 µm.

13. The three-dimensional printing system of claim 9, wherein the three-dimensional printing system is configured to form the second feature resolution with a tolerance less than 50 µm.

14. The three-dimensional printing system of claim 9, wherein the article is a hot gas path component of a turbine.

15. The three-dimensional printing system of claim 14, wherein the first powder material cut and the second powder material cut are of a same powder composition.

16. The three-dimensional printing system of claim 14, wherein the three-dimensional printing system is configured such that each of the first powder layer and the second powder layer is formed with only one of the first powder material cut and the second powder material cut to give a substantially uniform layer thickness.

17. The three-dimensional printing system of claim 9, wherein the article is a gas turbine component selected from the group consisting of a gas turbine seal, a gas turbine fuel nozzle, a gas turbine shroud, a gas turbine nozzle, and a gas turbine blade.

* * * * *